April 10, 1951 C. A. VOSSBERG ET AL 2,548,755
OPTICAL AREA MEASURING SYSTEM
Filed Dec. 12, 1947 7 Sheets-Sheet 1

INVENTORS
Frederic A. Firco
BY Carl A. Vossberg
S. Stephen Baker
ATTORNEY

April 10, 1951

C. A. VOSSBERG ET AL 2,548,755

OPTICAL AREA MEASURING SYSTEM

Filed Dec. 12, 1947

INVENTORS.
Frederic A. Fua
BY Carl A. Vossberg
S. Stephen Baker
ATTORNEY

April 10, 1951   C. A. VOSSBERG ET AL   2,548,755
OPTICAL AREA MEASURING SYSTEM
Filed Dec. 12, 1947   7 Sheets-Sheet 3
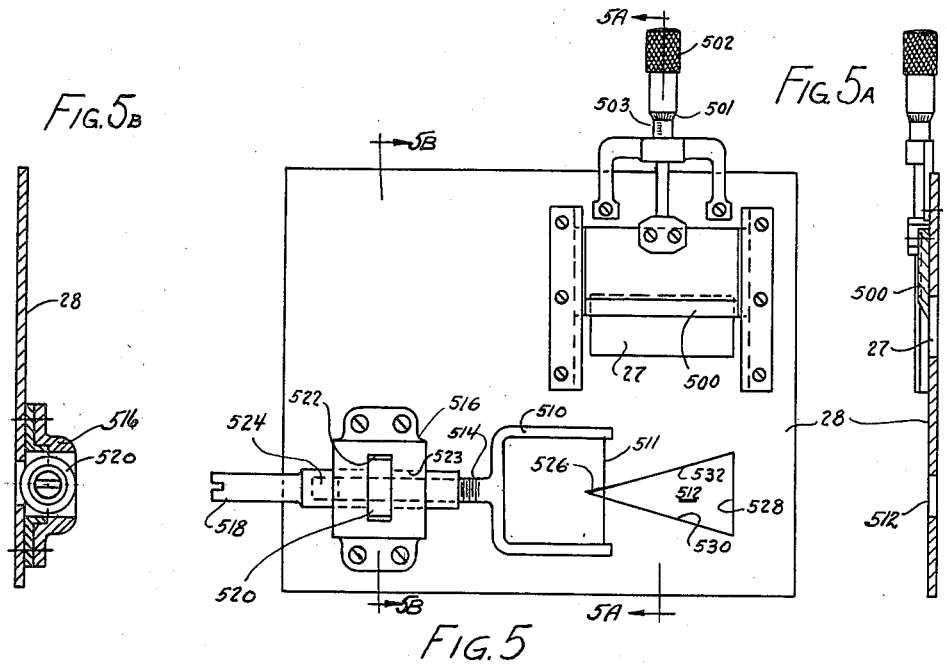
FIG.5B   FIG.5A
FIG.5
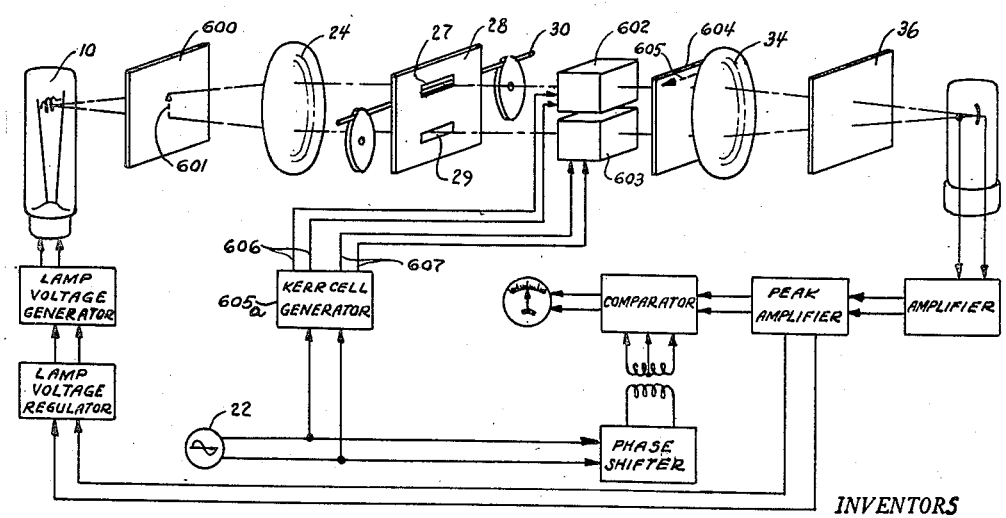
FIG.6
INVENTORS
Frederic A. Fua
Earl A. Vossberg
BY
S. Stephen Baker
ATTORNEY April 10, 1951 C. A. VOSSBERG ET AL 2,548,755
OPTICAL AREA MEASURING SYSTEM
Filed Dec. 12, 1947 7 Sheets-Sheet 4

INVENTORS
Frederic A. Fua
Carl A. Vossberg
BY
S. Stephen Baker
ATTORNEY

UNITED STATES PATENT OFFICE

2,548,755

OPTICAL AREA MEASURING SYSTEM

Carl A. Vossberg, Lynbrook, and Frederic A. Fua, New York, N. Y., assignors to Standard Electronics Research Corporation, New York, N. Y., a corporation of New York Application December 12, 1947, Serial No. 791,334

2 Claims. (Cl. 88—14)

This invention relates to measuring systems employing light modulation principles and provided with electronic circuits for measuring the degree of the modulation quantitatively.

The invention will be described and illustrated, by the way of an example, in connection with an electronic wire gage in which continuous light modulation is produced by a moving wire, this light modulation transformed into a measurable current, and the latter used for continuously indicating the diameter of the wire on the scale of a milliameter or other indicating device.

In any quantitative measurements, the accuracy and precision of final results are a function of a standard used for obtaining the measurements. When light and electronic circuits are used as a means for obtaining the measurements, the constancy of the light source and of the electronic circuits determine the degree of accuracy and precision. The invention discloses a system in which the inherent variations in the intensities of artificial sources of light and lack of stability of the electronic circuits are minimized to a very large extent, thus enhancing the accuracy and precision obtainable with the disclosed systems.

According to the disclosed invention, a beam of light, from a single source of light, is directed in alternating succession on two apertures so that this beam first passes through the first aperture and then through the second aperture. When the disclosed system is used as an electronic wire gage, a wire is drawn continuously and partially in light-intercepting relationship with respect to the beam passing through the first aperture so that only a portion of the light beam can pass through this aperture. Constant amount of light flux will pass through this aperture as long as the diameter of the sliding by wire remains constant, and there will be light modulation when there is any change in such diameter. Therefore, the first aperture and the wire act as a light-valve, the number of lumens passing through this light-valve being a function of the dimensions of the wire. The light passing through the first aperture is intercepted by a photoelectric cell, converted into electric current, which is amplified and then impressed on a comparator circuit. In the comparator circuit, this current is compared electronically with a "standard," which is a specially controlled reference signal or a reference current, and the resultant signal is impressed on a suitable current-measuring meter whose scale may be calibrated directly in units of length. Thus the meter indicates continuously the diameter of the sliding wire in inches, mils, millimeters or any other desired unit. To obtain the standard, or reference signal, the beam of light from the previously mentioned source of light is directed in alternate succession to the second, fixed aperture, whereupon the lumens passing through the fixed aperture are directed to and are intercepted by the same photoelectric cell, converted by it into intermittent, spaced pulses of current which are amplified by the same amplifier used for the amplification of the modulated pulses of current produced by the modulated light passing through the first aperture, and then impressed on the same comparator circuit. Here these fixed amplitude, fixed duration pulses act as "a standard" reference current, which is used for comparing it with the variable amplitude, fixed duration pulses produced by the light-valve.

It is to be observed that the system uses the same elements, i. e., the light source, the optical system, the photoelectric cell, the same amplifier and the common comparator circuit for generating, amplifying and comparing the variable amplitude, fixed duration intelligence signal, or a "wire" signal with the standard, the latter being the fixed amplitude, fixed duration reference signal. Therefore, any variations in the constancy or stability of these elements will affect the wire and the reference signals equally, i. e., the system is an inherently self-compensating system.

The invention is also particularly directed to circuits for regulating the source of light in a degenerative fashion by means of the amplifier output so as to maintain the number of lumens passing through the fixed aperture inversely proportional to any changes in the amplification constant of the system. Several types of circuits are disclosed for accomplishing this purpose. When the amplitude difference between the reference and the wire signal is not significant, a circuit is used which utilizes both signals for making the system inherently self-compensating. When the amplitude difference between the reference and the wire signals is significant, several types of circuits are disclosed which select only the reference signal undistorted by the wire signal and it is only the reference signal that is used for regulating the stability of the systems.

The invention also discloses a system in which the stability of the apparatus is controlled by controlling the dynode voltages of a photomultiplier which acts as a single tube amplifier for the entire system. In this case, the intensity of the light source is not controlled.

The invention also discloses special circuits particularly adapted to amplify only the upper portions of the reference and wire signals and reject the low amplitude portions of these signals for increasing the precision and accuracy of the final results.

It is therefore an object of this invention to provide a light modulation system and a method in which a modulated light signal and a standard reference signal follow each other in a predetermined manner, the number of the two signals being equal to each other in one complete cycle of the system, whereby the magnitude of the modulated signal can be compared with the reference signal for deriving continuously the magnitude of the modulated signal in terms of the magnitude of the reference signal with particular means employed for maintaining the fidelity or accuracy of the reference signal.

Another object of this invention is to provide a method and a system for measuring a linear distance continuously by converting said distance into a number of lumens inversely proportional to said distance, converting said lumens into a current whose amplitude is proportional to the number of said lumens, and comparing this current with a fixed reference current obtained from the conversion of a fixed number of lumens into the fixed current, the lumens being generated by the same source of light and converted into currents by the same conversion apparatus. Allied with this object is the provision of an electronic gage system in which the dimension of an object to be measured acts as a light-valve between a source of light and a photoelectric cell, the cell being connected to an amplifier, which is in turn connected to an electronic comparator circuit, and in which the system is made inherently self-compensating by generating a reference light signal through the said source of light and feeding it to the above amplifier. Thus, means are provided for first generating the light-valve signal and then generating the reference signal, the system further including particular means to maintain the constancy of the reference signal.

It is also an object of this invention to provide a light modulating system between a source of light and a photocell and to provide electronic means for converting the product of modulation into a first current for electronically measuring the degree of modulation by comparing said current with a second current of fixed magnitude derived through the same electronic means and by using the same source of light, and to make this system inherently self-compensating against any instability and ageing of the electronic means, the latter feature including means for regulating the intensity of the source in a degenerative manner solely by means of the second current, or for regulating the amplification constant of special amplifier circuits. Allied with this object is the provision of peak amplifier circuits for amplifying only the upper portions of the reference and intelligence signals, thereby increasing the resolving power, accuracy, precision, inherent stability, and self-compensating features of the disclosed systems.

Among the objects of this invention also is the provision of special photo multiplier circuits and means for self-compensating these currents by means of reference signals only, or by means of controlled reference and intelligence signals.

Still another object of this invention is to provide mechanical and electrical scanning systems which are synchronized and co-phased with the operation of electronic switches in the comparator circuits.

These and other objects will become more apparent from the following description taken in connection with the drawings in which:

Fig. 5 is an elevational view of a modified form of aperture plate.

Fig. 5a is a cross-sectional view taken along the lines 5a—5a of Fig. 5.

Fig. 5b is a cross-sectional view taken along the lines 5b—5b of Fig. 5.

Fig. 6 is a block diagram of a modified version of Fig. 1 with the mechanical scanning apparatus of Fig. 1 substituted by an electrical scanning apparatus.

Figure 1:
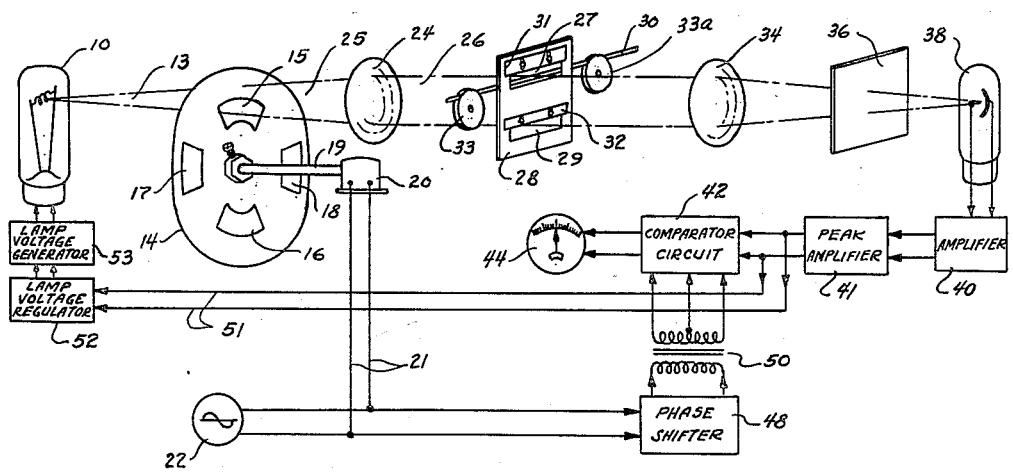
Fig. 1 is a schematic diagram of an optical system and a block diagram of the electronic system comparatively coupled to the optical system.

Referring to Fig. 1, a source of light 10 may be a tungsten or platinum filament electric light bulb, or a gas discharge source, or the light connected to a source of potential from lamp voltage generator 53. The action of the generator will be described in detail in connection with the description of Fig. 2. A beam of light from source 10 is directed onto a rotating scanner 14 provided with four apertures 15, 16, 17 and 18. The scanner may be a thin metallic disc with four concentrically disposed arcuate apertures, all four apertures spanning equal angles, each of which may be, for example, of the order of 45°. The arcuate apertures 15 and 16 are radially equidistant from the center of the disc which is also true of the apertures 17 and 18. However, the radial distance of the apertures 15 and 16 from the center of the disc is smaller than the radial distance of the apertures 17 and 18. The significance of this arrangement will become apparent in connection with the description of apertures 27 and 29. The disc is mounted on a shaft 19 of an electric synchronous motor 20 which rotates the scanner at a constant angular velocity. The synchronous motor is connected over conductors 21 to a source of alternating current 22. The scanner is so positioned with respect to the beam of light 13 that the latter illuminates the inner and outer sets of apertures uniformly.

From the description of the scanner given thus far it follows that a constant number of lumens will first emerge through aperture 15, then through aperture 17, the aperture 16, then 18, and the cycle will repeat itself indefinitely. Thus, in terms of electrical analogy, a continuous series of rectangular waves of light, all of equal amplitude, duration, and equally spaced from each other will be transmitted to a condenser lens 24, which, upon changing the divergent beam 25 into a parallel beam 26, will direct the light flux passing through the apertures 15 and 16 onto the lower aperture 29 in an aperture plate 28, and the light flux passing through the apertures 17 and 18 onto the upper aperture 27. Thus, the apertures 27 and 29 will be illuminated in alternate succession for equal lengths of time, with equal intensities of illumination, with equal periods of time between the periods of illumination.

The apertures 27 and 29 are illustrated as being of rectangular shape with the horizontal dimensions larger than their vertical dimensions although this is, of course, not necessary for the operation of the systems. The apertures may be substantially equal and either fixed or adjustable. The adjustability of the apertures 27 and 29 is illustrated in Fig. 1 by means of adjustable plates 31 and 32 having tightening nuts operating through slots. The practical mechanisms for adjusting the apertures will be discussed later in connection with the description of Fig. 5.

Since, as mentioned in the introduction, the selected example for illustrating the physical embodiment of the invention is the electronic wire gage, a continuously moving wire 30 is illustrated in the light-intercepting relationships with respect to the upper aperture 27. The length of the wire and the direction of its motion is in the specific example shown, made more or less parallel to the horizontal edges of the aperture, and so long as the diameter of the wire remains constant, the effective aperture opening is also constant. Rollers or any other suitable mechanical guides 33 and 33a are provided for supporting the bottom portion of the wire in light-intercepting relationship with respect to aperture 27 so that all variations in the diameter of the wire are transformed into the variations in the effective opening of the aperture. Therefore, if the diameter of the wire changes, the upper aperture becomes a variable aperture, and, as such, may be considered as a light-valve which modulates the beam of light passing through it. Since the vertical dimension of the wire aperture is greater than that of the wire, and the wire is positioned so that it is approximately at the mid-portion of its aperture, horizontal oscillation of the wire will have no effect on the final results.

The wire-light signal and the reference light-signal are impressed on a condenser lens 34 which focuses it at a photoelectric cell 38 through a diffusion screen 36. The diffused light appearing on the screen illuminates the entire cathode surface of the photoelectric cell in a substantially uniform manner so that the resulting photoelectric current will not be affected by variations in the photo-emissive properties of the photo-sensitive area of the photoelectric cell. The light falling on the cathode excites the photoelectric cell 38 which is connected to an amplifier 40 whose output is illustrated in Fig. 3a. It consists of a series of substantially rectangular waves 300 and 302 separated from each other by equal "zero signal" periods 304 which correspond to the periods during which the wire aperture 27 and the reference signal aperture 29 remain unilluminated. The amplitudes of the reference signals 302 remain constant so long as all the parameters of the system remain constant. In the illustrated system, the amplitudes of the wire signals 300 are slightly smaller than the amplitudes of the reference signals since the wire reduces the amount of light passing through the wire aperture 27. The amplitude of this signal is a function of the diameter of the wire and is controlled by the latter.

Figure 3:
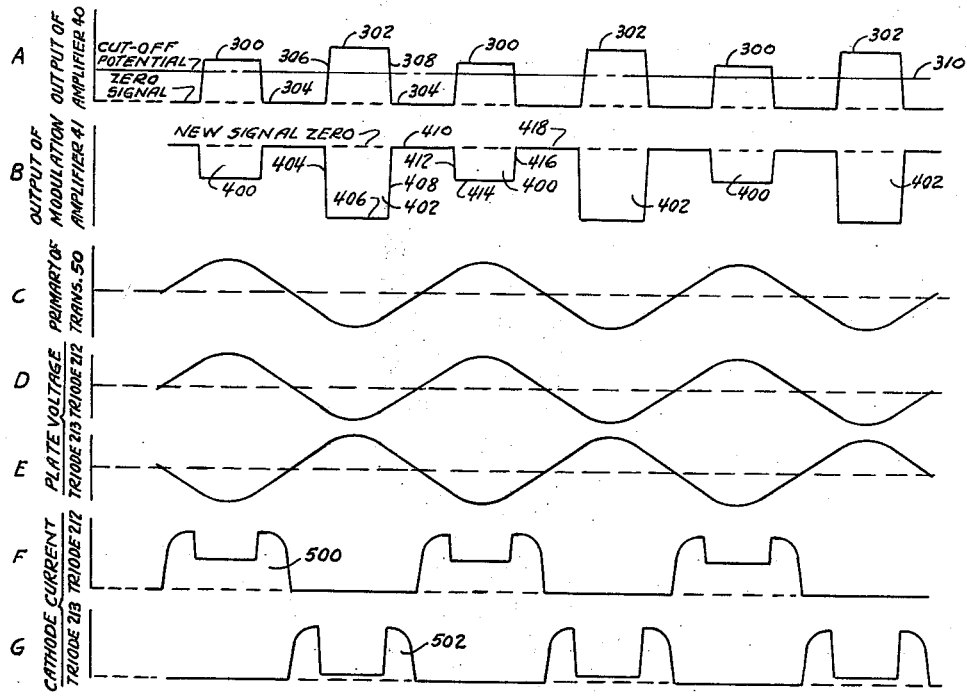
Fig. 3 illustrates oscillograms of signals encountered in the circuits of the electronic systems of Figs. 1 and 2.

The rectangular waves 300 and 302 are impressed on a peak amplifier 41 which amplifies primarily only the difference between the amplitudes of the reference and the wire signals so that such difference becomes more conveniently measurable. The output of the peak amplifier is illustrated in Fig. 3—B, which illustrates the fact that the peak amplifier increases the amplitude difference between rectangular waves 400 and 402, which correspond to the waves 300 and 302 respectively in Fig. 3—A. The amplified peaks 400 and 402 are impressed on a comparator circuit 42 which compares the amplitudes of the reference signals 402 with the amplitudes of the wire signals 400. This comparison is instrumental in producing a reading on an indicator such as milliammeter 44. The meter reading is proportional to the arithmetic difference between the amplitudes of the two signals, which is the electrical equivalent of wire diameter. Therefore, the scale of the meter may be calibrated directly in any desired units of linear distance, such as mils, inches etc.

The operation of the comparator circuit is synchronized with the operation of the synchronous motor 20 through the common source of alternating potential 22. Source 22 is connected to the comparator circuit through a phase shifter 48 and a transformer 50, and it is directly connected to motor 20 over the conductors 21. Phase shifter 48 is used only for the initial co-phasing of scanner 14 and comparator 42. The same co-phasing can be accomplished by providing mechanical means for adjusting the angular position of the scanner on the shaft 19 of the motor, such as by the set-screw shown.

The entire output of the modulation or peak amplifier 41 is also impressed over conductors 51 on a lamp voltage regulator 52 which functions in a degenerative manner decreasing the lamp voltage impressed on lamp 10 by a lamp voltage generator 53 if the amplitude of the reference signal increases, and vice versa. The function performed by this regulator is to maintain the amplitude of the reference signal 302—402 constant and independent of any possible variations in all electrical parameters of the system. This will be described more in detail in connection with the description of Figs. 2 and 4 which are the schematic diagrams of the modulation amplifier 41, comparator 42, lamp voltage regulator 52 and lamp voltage generator 53.

Figure 2:
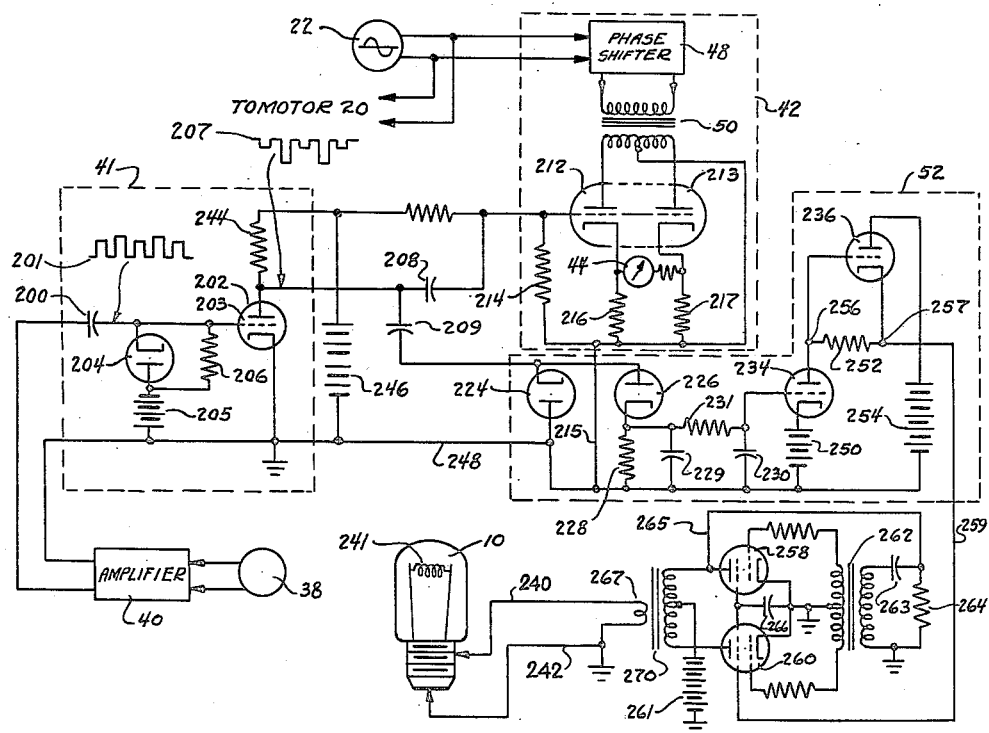
Fig. 2 is a schematic diagram of the electronic system disclosed in Fig. 1.

Referring to Fig. 2, the photoelectric cell 38 is connected to the amplifier 40, and the output of the latter is impressed on a coupling condenser 200. The oscillogram of the signal is illustrated at 201, and it corresponds to the positive rectangular waves 300 and 302 illustrated in Fig. 3—A. The output of amplifier 40 is impressed on what we refer to as a modulation or peak amplifier 41, which is constituted by a triode 202 and a diode 204. Its connections and operations are as follows:

Condenser 200 is connected to the grid 203 of a triode 202 and the cathode of a diode 204 whose plate is grounded through a biasing battery 205. The negative terminal of the biasing battery is also connected to grid 203 through a grid resistor 206. Triode 202, because of the biasing potential 205, acts as a Class C amplifier, and diode 204 acts as a direct current restorer. When positive wave front 306 of the rectangular wave 302 is impressed on grid 203 and on the cathode of diode 204, the latter remains non-conductive and a large potential drop appears across resistor 206 because of the condenser charging current flowing through the circuit including condenser 200, resistor 206, battery 205 and the conductors coupling condenser 200 to amplifier 40. The time constant of the R—C combination 206—200 is made sufficiently large to maintain this voltage substantially constant throughout at least a cycle. The positive grid signal impressed on grid 203 at this instant must be sufficiently high to overcome the negative biasing potential 205. Therefore, triode 202 will produce linear amplification of that portion of the positive signal which is in excess of the cut-off potential of tube 202. Accordingly, a negative signal 207 appears in the plate circuit of this tube. On the downward excursion 308 of wave 302, triode 202 is made non-conductive because of the discharging cycle of condenser 200, and bias 205 which impresses negative potential on grid 203. In order to discharge condenser 200 to the "zero signal" (Fig. 3—A) level 304, it becomes necessary to provide a low impedance path to ground and this is furnished by diode 204. Thus, the time constant of the R—C combination 200—204 is a short one, as compared to the time constant of 200—206 combination.

The biasing voltage 205 and the positive signal impressed on the grid should be so adjusted that linear amplification begins in amplifier 202 only when the minimum anticipated amplitude of the wire signal 300 is slightly higher than the cut-off potential of triode 202. This is indicated by a broken line 310 in Fig. 3—A. Therefore, amplifier 202 will amplify, in the main, only the difference in the amplitudes of the reference and wire signals 302 and 300 with the remaining amplitudes being blocked off at this peak amplifier. It is to be noted, however, that the entire amplitude of the signals is nevertheless utilized for obtaining this sought result because of the use of diode 204 which permits complete discharge of condenser 200 to the zero signal level, Fig. 3—A. The signal appearing in the output of triode 202 is illustrated at 207 in Fig. 2 and at B in Fig. 3. As mentioned previously, the difference between the amplitudes of the reference signal 402 and the wire signal 400, has been increased first by the elimination of the lower bottom portions of the signals 300—302, and scond by the amplification factor of triode 202.

An important function of restoring the signals to direct current is the maintenance of the fidelity or accuracy of the reference signal for purposes which will more fully appear hereinafter. This is achieved in spite of variations which are encountered in the wire signal. If the wave were permitted to remain as a purely alternating current wave, any variations in the wire signal would be reflected as variations in the reference signal because the energy represented by the wave would tend to distribute itself symmetrically on both sides of the zero line. Such distribution would affect the amplitude of the reference signal and the accuracy of the system. By restoring the wave to direct current, however, the reference signal may be made independent of such variations.

The output of triode 202 is impressed in parallel over condensers 208 and 209 on the grids of triodes 212—213 and on a peak-to-peak detector formed by two diodes 224 and 226, which are connected in parallel but in opposite sense. The comparator circuit will be described first.

The comparator circuit is formed by the two triodes 212 and 213. The comparator circuit, as its name implies, compares the amplitudes of the reference and wire signals, and produces a meter reading on meter 44 proportional to the diameter of wire 30, Fig. 1. The grids of the triodes 212 and 213 are connected together so that the same signal 207 is impressed on both grids simultaneously. Signal 207 is also illustrated in Fig. 3—B. The grids are grounded through a grid resistor 214 and conductor 215. The cathodes are also grounded through the same conductor and the cathode resistors 216 and 217 which are serially connected to the secondary of transformer 50 previously shown in Fig. 1. The secondary is provided with a mid-tap which is connected to ground, thus completing the cathode-anode circuits of the triodes 212—213. As mentioned previously, the alternating current source 22 is connected to the primary through the phase shifter 48 when such is used. The sinusoidal wave impressed on the primary is illustrated at C.; the voltages impressed across the ground anode circuits of the triodes 212 and 213 at D and E respectively. The sinusoidal wave 3—C is co-phased with the signal 3—B by adjusting the phase shifter 48 so that the maximum and minimum voltages of the sinusoidal wave 3—C coincide, in terms of time, with the mid-portions of the rectangular waves 400 and 402 respectively. Because of the coincidence of the grid signals 400 on the grid of triode 212 with the positive plate signals illustrated in Fig. 3—D, triode 212 will be rendered conductive for the duration of the positive sinusoidal wave 3—D with the wire signal 400 subtracting itself from this sinusoidal wave, with the result that the amplitude of the current signal appearing in the cathode follower resistor 216 will be inversely proportional to the amplitude of the wire signal 400. The current signal through cathode resistor 216 is illustrated at F in Fig. 3. The same mode of operation applies to triode 213 with the current flowing through the cathode resistor 217 being illustrated at G in Fig. 3. Thus, the triodes 212 and 213 act, in a sense, as an electronic switch which separates the wire signal 400 from the reference signal 402, Fig. 3, the two appearing in the respective cathode circuits of the triodes as two separate signals 500 and 502. Therefore, meter 44, connected across the cathode circuits of the triodes 212 and 213, will indicate the difference in the amplitudes of the wire signals 500 and the reference signal 502. It is this signal that will correspond to the diameter of wire 30.

In order to stabilize the reading of meter 44 by maintaining the amplitude of the reference signal 502 constant, which will also stabilize the amplitude of the wire signal 500, except for its normal modulation by the variations in the diameter of wire 30, the system is provided with a lamp voltage regulator 52, Fig. 1, the schematic diagram of which includes the peak-to-peak detector composed of the diodes 224—226. The output of the detector is impressed on a filter circuit including a cathode resistor 228, condensers 229 and 230, and a resistance 231. This filter circuit is connected across the input of a triode 234 which, together with a triode 236, control the current flowing across the filament of the lamp 10, this filament being connected across conductors 240 and 242. The function of the peak-to-peak detector circuit is to separate the reference signal from the wire signal so as to employ the reference signal for lamp excitation regulation purposes without impairing the constancy of the reference signal in so doing. In addition, the influence of the wire signal on the reference signal is eliminated, or at least minimized through the same action performed by the D. C. restorer 204.

Proceeding with a more detailed description of the peak-to-peak detector, a negative signal 207 is impressed on the detector across condenser 209. This signal also appears at B in Fig. 3, and the operation of the detector will be discussed together with the wave forms 3—B. When a negative wave front 404 is impressed on the cathode of diode 224 and on the plate of diode 226, diode 224 becomes conductive, the circuit at this moment being grounded bus 248, diode 224, condenser 209, a plate resistor 244, a source of potential 246, and grounded bus 248, which completes the circuit for discharging condenser 209. At this instant diode 226 is non-conductive. Condenser 209 is maintained in a discharged state throughout the period of the duration of the negative pulse 402, this period being indicated by the flat portion 406 of the signal. When the direction of the potential impressed on condenser 209 reverses, which is illustrated at 408 in Fig. 3—B, a charging cycle of condenser 209 begins which makes diode 226 conductive over the circuit including cathode resistor 228. This charging cycle persists throughout the flat portion 410 of the signal with the result that the upper plates of the condensers 229 and 230 receive a positive charge since these condensers are connected across cathode resistor 228, this charge corresponding to the amplitude of the reference signal. When the negative portion 412 of the wire signal is impressed on condenser 209, diode 224 becomes again conductive, and discharges condenser 209 during the flat portion 414 of the wire signal. The wire signal then begins to travel from its portion 414 in the direction indicated by line 416 to a more positive flat portion 418. Diode 224 becomes non-conductive but diode 226 remains non-conductive because of the high potential impressed by the condensers 229 and 230 on the cathode resistor 228. Therefore, the direct current potential appearing across the filter circuit will be controlled only by the reference signal, and, as a consequence, the subsequent circuits, including triode 234—236, oscillator 258—260, and the lamp filament 241, will be controlled exclusively by the amplitude of the reference signal.

The connections and the operation of the triodes 234 and 236 are as follows: The cathode of triode 234 is connected to bus 248 through a biasing battery 250 with the positive terminal of this battery connected to the cathode and its minus terminal connected to the bus 248. The plate of triode 234 is connected to a plate resistor 252, and the right terminal of this resistor is connected to the cathode of triode 236. The plate of triode 236 is connected to the positive terminal of a source of potential 254, the negative terminal of which is connected to the grounded bus 248. The grid of triode 236 is connected to the junction point 256, and the junction point 257 is connected through a conductor 259 to the screen grids of tetrodes 258 and 260 which supply current to lamp 10. From the description of the connections it follows that the triodes 234 and 236 are connected in series with the biasing battery 250 opposing the flow of current in this circuit, while battery 254 acts as a common B battery for the cathode-anode circuits of the triodes 234 and 236. The potential across the filter circuit, which appears as a positive potential on the grid of triode 234, overcomes the biasing potential 250 with the result that the triodes 234 and 236 are partially conductive. If there is any variation in the potential appearing across the filter circuit, it will affect the conductivity of triode 234, which will also affect the conductivity of triode 236 because the plate resistor 252 is connected between the cathode and the grid of triode 236.

The oscillator circuit includes two power tubes 258 and 260 the plates of which are connected to each other through the primary of a step-down transformer 270. The primary of transformer 270 is provided with a center tap which is connected to a source of potential 261. While this source of potential has been illustrated as a separate source, in actual practice the sources 254 and 261 may be combined to constitute a single potential source. The control grids are connected to the secondary of a transformer 262, the primary of which, together with condenser 263 and resistor 264, form an oscillator loop connected to the plate of tetrode 258 by a conductor 265. The screen grids are connected to ground through a condenser 266. The low-voltage secondary 267 of transformer 270 is connected across the filament 241 of lamp 10 corresponding to the similarly numbered lamp in Fig. 1. From the description given thus far, it follows that the oscillator 258—260, in which the grids are inductively coupled to the anodes, will oscillate at the frequency determined by its parameters, and that its amplitude can be controlled by the potential impressed on the screen grids of the tetrodes 258—260. A suitable operating frequency may be one that is sufficiently high to avoid light modulation effects such as 1500 cycles per second.

The screen grids of tetrodes 258—260 are connected in series with the following circuit: Grounded bus 248, battery 254, cathode-anode circuit of triode 236, conductor 259 and, for alternating current, the grounding condenser 266. Therefore, any increase in the conductivity of the triode 236, which happens when the amplitude of the reference signal decreases, will increase the amplitude of the oscillator 258—260 by impressing a more positive potential on the screen grids of the tetrodes. This, in turn, will increase the voltage impressed on the filament 241 so that more light will pass through the fixed aperture 29. This, in turn, will increase the amplitude of the reference signal 302 and 402, Fig. 3, thus bringing its amplitude to normal. The same compensating action, but in reverse order, to the one described above, will take place when the amplitude of the reference signal increases due to an increase in any voltages connected to the system, ambient temperature variations, or any other factors producing the above change in the amplitude of the reference original. Therefore, the regulator-generator acts in a degenerative manner which means that when the conductivity of triode 234 is increased because of the increase in the amplitude of the reference signal, larger plate current will tend to flow in triode 234 which will at once lower the potential impressed on triode 236 tending to make the latter less conductive and thus decreasing the amplitude of the oscillator. Accordingly, the current flowing in the lamp circuit will be decreased. This, in turn, will decrease the amplitude of the reference signal.

The disclosed system, therefore, is self-compensating in a highly effective manner because it uses the same amplifier for generating the reference and the wire signals, and the lamp voltage regulator further maintains the amplitude of the reference signal constant by varying the intensity of the light source 10. Therefore, the reading of meter 44 will correspond continuously to the diameter of the wire and will measure this diameter faithfully in spite of variations in the parameters of the electrical circuits.

Figure 4:
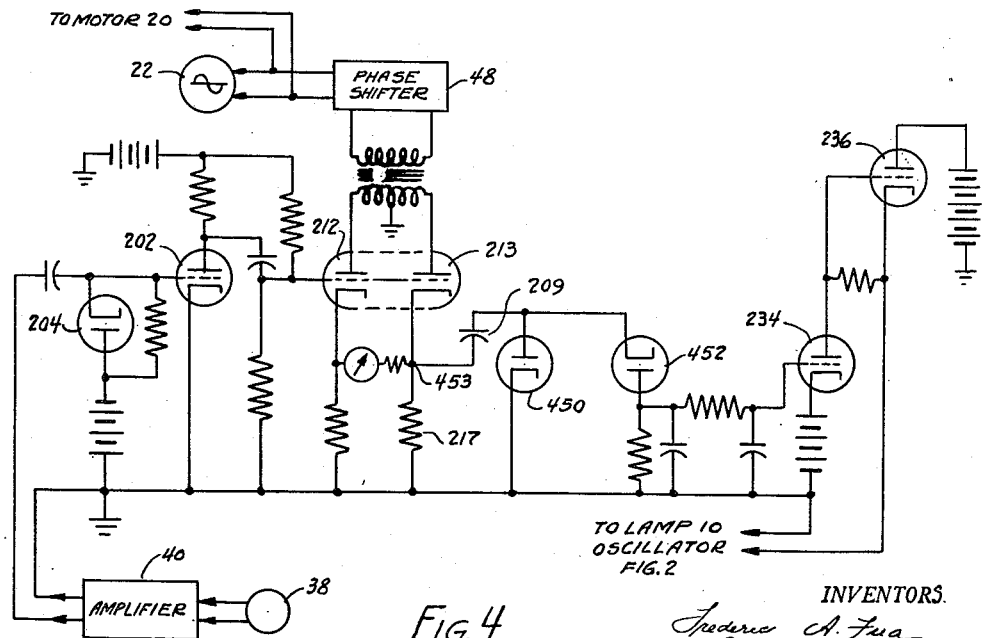
Fig. 4 is a schematic diagram which discloses a modification of Figs. 1 and 2, the modification residing in connecting the lamp voltage regulator circuit to a portion of the comparator circuit.

In Fig. 2, the lamp voltage regulating circuit is connected to the output of the modulation amplifier 202 through a condenser 209. Therefore, in Fig. 2, the lamp voltage regulator will compensate for all fluctuations preceding the comparator. Stated differently, the regulator will respond to any fluctuations in amplifier 40, light source 10, and modulation amplifier 41. However, the lack of stability in the comparator triodes 202 and 213 will not be reflected in the output of the lamp voltage regulator. Since it is desirable to include all the variations that are possible in the wire measuring circuits in the regulator circuit, the lamp voltage regulator can be connected to the output of the comparator circuit. This is illustrated in Fig. 4 which is identical in all respects to Fig. 2, except that condenser 209 has been connected directly to the cathode of triode 213 at the junction point 453 of this cathode with the cathode resistor 217. In this modification all wire measuring circuits, including peak amplifier 202 and the comparator triodes 212 and 213, function in exactly the same manner as in Fig. 2, but the signal impressed on condenser 209 now corresponds to the signal illustrated at G in Fig. 3. Since the polarity of this signal is positive, the position of the diodes 224 and 226 in Fig. 4 has been reversed with the result that condenser 209 is charged through a diode 450 and is discharged through a diode 452. It should be noted, however, that since cathode followers are inherently degenerative, and thus minimize instability, the modification illustrated in Fig. 4 constitutes a refinement which can be dispensed with for practical purposes, i. e., the peak-to-peak detector may be connected to the output of the peak amplifier 202, which obviously produces once more what is disclosed in Fig. 2.

In the description of Fig. 1 it has been stated that both the wire and the reference signal apertures 27 and 29 respectively can be made adjustable. A modified mechanical arrangement suitable for this purpose is disclosed in Fig. 5, which illustrates the aperture plate 28 with the aperture-adjusting mechanisms being connected to and supported by this plate. The upper aperture 27, which is the wire aperture, is provided with a sliding shutter 500 which is operated by means of a slide micrometer 501 provided with a knurled knob 502, the shutter 500 being connected to the micrometer spindle. The shutter can be raised or lowered by turning knob 502, and the degree of lowering of the shutter can be read directly on the micrometer scale 503. Thus, the wire aperture can be calibrated directly according to the dimensions represented by scale 503 of the micrometer. For example, the micrometer reading can be set to zero for any specific signal output, and the micrometer movement necessary to bring the signal output to the same value will be exactly equal to the diameter of the wire. If the signal output is not precisely the same, the meter will indicate the correction which should be applied to the micrometer reading. Thus, the gage is a standard device by itself. Moreover, the slide micrometer used for adjusting the opening of the wire aperture can be used for calibrating the scale of the meter 44 from the readings of the slide micrometer. Any desired sensitivity of calibration can be made by adjusting the gain of the discriminator circuit 202—204 and the gain of the discriminator circuits in Figs. 7 through 10. The electrical indications on meter 44, therefore, can be made to act as a vernier expanded scale of the micrometer 501 when high degree of amplification is used; or it may have a similar, or even less, sensitivity than micrometer 501 if lower amplifications, lower sensitivities, are satisfactory, depending upon the precision of the final results desired. Thus, the precision of the entire system is made adjustable so as to conform with its contemplated application.

As will be explained hereinafter, the electrical circuits can be also provided with the adjustments which enable one to adjust an electrical zero of meter 44 and its circuits so that the aperture adjustments may be eliminated. In the disclosed embodiments, this zero adjustment is in the form of a potentiometer which itself can be calibrated in terms of desired linear units used for measuring the transverse dimension of the article passing by the aperture 27. In the latter case, the calibrated scale of the potentiometer can replace the scale of the slide micrometer 501 or may be used to augment the slide micrometer calibration.

The method of adjusting the opening of the reference aperture includes a wire yoke 510 provided with a fixed wire 511 strung across the open end of yoke 510. This wire can be actuated laterally to move across the field of the reference aperture 512, which, in this case, has been given a triangular form. Thus, the number of lumens passing through aperture 512 varies according to the lateral position of the wire 511. The yoke 510 is provided with a micrometer screw 514, a stationary nut holder 516 supported by the aperture plate 28, a yoke nut 518, and a coupling washer or collar 520 which is fastened to the yoke nut 518 so as to form an integral part of the latter. Washer 520 is mounted in a slit 522 provided for this purpose in the nut holder 516. The nut holder 516 is provided with a cylindrical bore 523 which accommodates the cylindrical portion of nut 518 in such a manner that holder 516 and nut 518 form a sliding engagement with respect to each other so that nut 518 can be rotated within the nut holder. Nut 518 is provided with a central bore 524 and the inner surface of the latter is threaded with the same thread used for threading the micrometer screw 514. Therefore, the micrometer screw 514 and nut 518 are capable of forming a threaded engagement with each other, as it is illustrated in the figure, and turning of nut 518 will alter the position of the wire yoke 510 and wire 511 with respect to the triangular aperture 512. Since aperture 512 is of triangular shape, it follows that any change in the lateral position of the wire yoke 510 and wire 511 with respect to aperture 512 will either decrease or increase the amount of light intercepted or blocked by wire 511. Thus, when wire 511 is in the vicinity of the apex 526 of the aperture, only a very limited amount of light will be intercepted by the wire, this amount of light being equal to the diameter or width of wire 511 multiplied by that length of wire 511 which is in the path of the light flux passing through aperture 512. As wire 511 is moved from the apex 526 to the vertical edge 528 of this aperture, the length of the wire increases, which at the very same time increases the area intercepting the flux lumens. From this it follows that the disclosed adjustment represents an exceedingly fine adjustment of the area of the aperture, and, as a consequence, represents an exceedingly fine adjustment of the amplitude of the reference signal. While in Fig. 5 a triangular aperture has been illustrated, it is apparent that other shapes can be used, and even finer adjustments may be obtained when the sides 530 and 532 of the illustrated triangle, for example, are replaced with the hyperbolic or parabolic curves. The same result will also be obtained if the triangular aperture be replaced with the rectangular aperture and the angle, or the position of the rectangle with respect to wire 511 is adjusted in such a manner as to make the latter act as a hypotenuse or a diagonal with respect to the opening.

It may be observed that it is not essential for the micrometer slide 500 in Fig. 5 to cover the aperture 27 which selects the light changes due to the wire modulation. Instead, the micrometer slide attachment may be disposed in similar operative relation to the reference aperture 29 of Fig. 1 and the effect will be the same except that the readings will be reversed. Under such modified circumstances, the constancy of light distribution or homogeneity of light propagation will not necessarily be held to close tolerances. This follows because the wire aperture can be initially compensated for light effect change for different positions of the wire. For example, if the light distribution varies over the extent of the aperture, the dimension of the aperture can be changed to compensate specifically for such variations. In other words, if a particular point on the aperture receives more light than other points, the size of the aperture may be reduced at that particular point as will be evident. This is a permanent adjustment. In a similar manner, the reference aperture can be adjusted for proper standardization. That is, a given change in micrometer reading can be made to correspond exactly to an equivalent wire diameter change. These two functions, constancy of output for different wire positions and standardization, may be made independent. The regulating system disclosed will control the gain to offset the apparent change in the reference signal.

An additional modification of Fig. 1 is disclosed in Fig. 6. It is known that when a liquid is placed in an electric field it becomes doubly refracting and behaves optically like a uni-axial crystal with the optic axis parallel to the field direction. Such a device, known as a Kerr cell, is herein employed to replace the scanning disc 14 and motor 20 of Fig. 1. In Fig. 6, 600 is a polarizer, such as any of various devices employed to polarize a beam of light, e. g. a Nicol prism, a mirror inclined at a critical angle, or the like. The arrow 601 indicates the direction of polarization. The beam of light is then made parallel by lens 24 and is projected on apertures 27 and 29. The light from the upper aperture 27 passes through Kerr cell 602 while the light of the lower aperture 29 passes through Kerr cell 603. The two beams then hit analyzer 604 which, as noted by arrow 605, is crossed with respect to polarizer 600 so that normally no light passes through the analyzer. If the Kerr cells 602 and 603 are alternately excited, the lights of either the upper or the lower aperture will be permitted to pass through the analyzer and excite the photocell as above described. The use of such an electronic shutter permits much faster scanning of the beam of light which in some cases is of pronounced advantage. The Kerr cells may be replaced with cells utilizing the Cotton-Mouton effect, as will be apparent. Kerr cell generator 605a is the conventional high voltage generator for the plates of the Kerr cells, it being understood that the rotation of the plane of polarization of such cells is a function of voltage and further depending on the length and the distance between plates. Conductors 606 and 607 respectively supply the electric current to the Kerr cells. The other components illustrated function similarly to those in the preceding figures.

In the system described thus far, conventional amplifier circuits using triode, tetrodes, or pentodes, are used for amplifying the output of the photoelectric cell 38. In circuits of this type, although many variable parameters are involved, effective self-compensation was obtained by controlling only the voltage impressed on filament 270 of the source of light 10 in the system disclosed in Figs. 1, 2, 4 and 6. However, it is possible to devise electronic circuits which, because of their inherent characteristics, can be controlled very effectively so as to maintain the amplitude of the reference signal, and therefore the amplitude of the wire signal, at the required level without resorting to the control of the light source 10. Such circuits are disclosed in Figs. 7, 8, 9 and 10, where a single photomultiplier tube performs the dual function of converting the light lumens into the electron current and amplifying it by the secondary emission elements and the reflectors. In a system of this type, since the conversion of the lumens into the electric current, and the amplification of this current is performed by one tube, it becomes possible to control the amplitudes of the signals in the photomultiplier by controlling the high voltage supply to the dynodes of the photomultiplier. Circuits are disclosed in which this voltage is controlled, in some instances, solely by the amplitude of the reference signal, and, in some instances, by the reference signal as well as by the wire signal. The latter type of control is especially suitable and applicable to the systems in which the difference in the amplitudes between the reference and the wire signals is so small that the created error, because of the use of the two signals rather than the reference signal alone for controlling the dynode voltage becomes, in practical terms, merely a theoretical error which has no practical significance.

In the systems of this type, the optical system is identical to optical systems disclosed in Figs. 1 and 6 and therefore its description will not be repeated here. Suffice it to say that, as before, a single source of light is used for furnishing the necessary flux lumens for the wire and reference apertures and the light passing through the apertures, after being scanned, is focused on the electron-emissive surface of the photomultiplier. Therefore, as in all previous cases, the cathode of the photomultiplier will be subjected to light excitation by the reference and wire signals in alternate succession in the manner described previously in connection with the description of Figs. 1 through 6. This being the case, the description that is to follow will be restricted and will begin with the description of the photomultiplier and the circuits connected to the output of the latter. It may be again noted, that since the light source is not controlled by the output of the photomultiplier tube, any independent source of excitation for the light source 10 can be used. This can be either a source of direct current or a source of alternating current and, in the latter case, the current may be sufficiently high frequency so that the intensity of light generated by filament 241 is fairly constant and its calorific inertia acts as an integrating means for the power used for its excitation.

Figure 7:
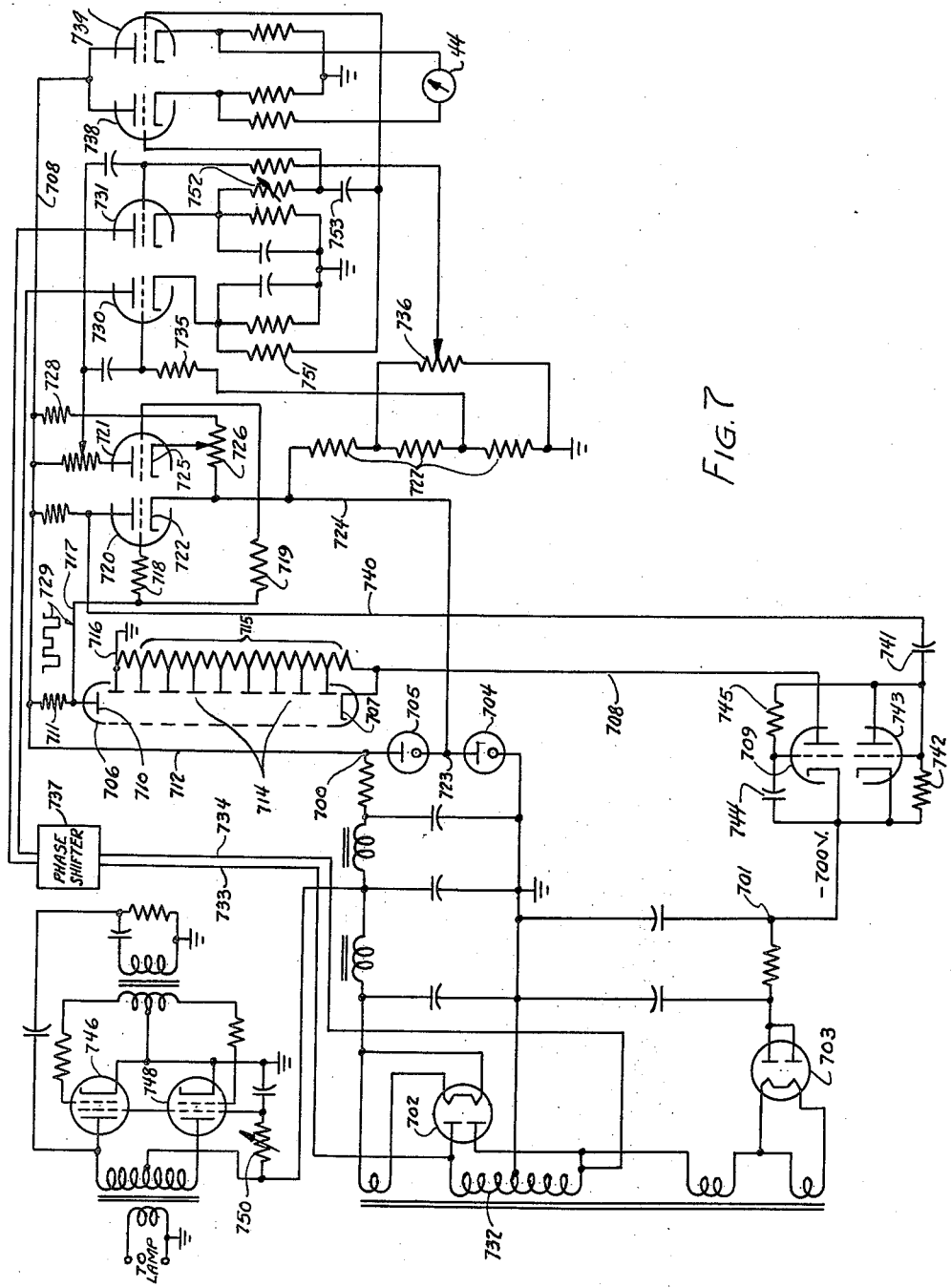
Fig. 7 is the schematic diagram of electronic circuits used in connection with the optical system disclosed in Figs. 1 and 6.

Proceeding now with the description of Fig. 7, a high voltage appears across the junction points 701 and 716, this voltage being furnished by the rectifier 703. The description of the rectifier circuit is not necessary because it is of conventional nature and well known in the art. The cathode 707 of the photomultiplier tube 706 is connected to the negative bus which, in this case, is point 701, over a conductor 708, and the cathode-anode circuit of a triode 709 which controls the dynode voltage impressed on the photomultiplier. The anode 710 of the multiplier is connected through a resistor 711 and a conductor 712 to the positive bus which is represented by the junction point 700 in the diagram. The reference and wire signals excite, in alternate succession, the photo-emissive cathode 707 and this electron current is amplified by means of the reflectors and the secondary electron emitters illustrated in the figure and generally designated by the numeral 714. These are connected to the voltage dividers, generally designated by the numeral 715, and the last resistor and this voltage divider are grounded by ground 716. The output of the photomultiplier is impressed, over a conductor 717 and grid current limiting resistors 718 and 719, on the control grids of triodes 720 and 721 the plates of which are connected through resistors to the positive bus 708 the potential of which, for example, may be in the order of 250 volts to the ground. The cathode 722 is connected to the junction point 723 interconnecting the anode of the voltage regulator 704 to the cathode of the voltage regulator 705, this connection being accomplished through a conductor 724. This connection furnishes a positive reference bias across the cathode grid circuit of triode 720. Therefore, triode 720 is normally fully conductive. Cathode 725 of triode 721 is connected to a potentiometer 726, this potentiometer, on one side, being at same potential as cathode 722 and, on the other side, being connected to the positive bus 708 over a resistor 728. With no input signal impressed on the photomultiplier, triodes 720 and 721 are both at maximum conduction with positive grid voltages being limited by the resistors 718 and 719. Under these conditions, these triodes function approximately as a two-step or variable mu amplifier. Thus, while the grid is positive the gain is quite low because of saturation of the tube, but when the grid becomes negative up to cut-off, the amplification factor is high and the gain is accordingly high. This mode of operation of the triodes 720 and 721 is used for amplifying primarily the peaks of the reference and wire signals so that in this respect the functioning of these triodes may be compared to the function performed by the D. C. restorer 204 and the negatively biased Class C amplifier triode 202 in Fig. 2. It is especially advantageous to operate these triodes in this manner because, as mentioned previously in connection with the discussion of the triode 202-D. C. restorer 204 combination, it enables one to amplify primarily the upper portions, or the peaks, of the wire and reference signals so that this difference can be used advantageously in the subsequent circuits for a more precise measurement of the diameter of the wire. The output of the photomultiplier tube which impresses strong negative pulses 729 on the grids of the triodes is sufficient to drive the grids to the negative region. Triode 721 is more easily driven because its cathode is at a less negative potential which is impressed upon it by the voltage divider circuit including potentiometer 726, and resistor 728. Because of this difference in the cathode connections of the two triodes, the output of the triode 721 is similar to the signals illustrated in Figs. 3-B, except that they are of opposite polarity. Triode 721 will thus respond to the wire as well as to the reference signal in spite of the fact that there may be a considerable difference between their amplitudes. A different mode of operation, however, takes place in triode 720. Assuming again that the reference signal is at all times greater than the wire signal, the voltages of this triode, as well as the intensity of the output signal of the photomultiplier, are so set that the grid of triode 720 is made negative only by the reference signal. Therefore its output contains substantially only the reference signals with the wire signals being blocked at this point. While the output of the triode 721 is used in the subsequent circuits for comparing the amplitudes of the wire and the reference signals in the comparator circuit, the output of triode 720 is used for controlling the dynode voltage impressed on the photomultiplier.

Only a brief description of the comparator circuit will be given here since the essential features of such circuit have been described already in connection with the description of Fig. 2. The output of triode 721 is impressed on the control grids of triodes 730 and 731, the plates of which are connected to the secondary 732 of the rectifier circuit over conductors 733 and 734. Therefore, alternating current is impressed on the anodes of these tubes and the two act as an electronic switch for directing the reference signal into one channel and the wire signal to the other. The grids are properly biased through the connections including resistor 735 connected to the voltage divider 727 and a potentiometer 736 which is connected to the grid of triode 731. As in the previous figures, a phase shifter 737 may be interposed between the source of alternating current and the electronic switch for synchronizing and co-phasing the operation of the electronic switch with the scanner. Potentiometer 736 can be used for adjusting the electrical zero of meter 44 used in the output of the triodes 738 and 739. It should be noted here that the potentiometer 736 can be used for not only adjusting the electrical zero of the system, but it can be calibrated to represent linear distances in the units used for measuring the diameter of the wire or any other element.

The outputs of the electronic switch 730—731 are impressed on the grid of triodes 738 and 739 through a filter circuit comprising resistors 751 and 752 and capacitor 753. This filter serves to damp out rapid signal fluctuations and may be used to limit the reading variations so that a trend is only registered. Tubes 738 and 739 are essentially current amplifiers with the result that the diameters of the wire are indicated directly on the dial of meter 44 connected across the cathode circuits of these triodes.

Proceeding now with the description of the dynodes voltage control circuit, it begins with the output of triode 720 which contains, as above stated, only the reference signal. This signal is impressed over a conductor 740, a condenser 741, and a resistor 742, across the diode 743 which detects this reference signal. The detected reference signal after filtering by a condenser-resistance combination 744—745, is applied to the grid of triode 709, the cathode-anode circuit of which is connected in series with the photo-sensitive cathode 707 of the photomultiplier. Accordingly, diode 743 acts as the control tube for adjusting the high voltage supply for the dynodes of the photomultiplier 706 through triode 709, which itself acts as a variable impedance in series with the dynode voltage. For illustration, let us assume that the reference signal tends to increase due to an increase in light, gain of amplifier, etc. This increase will bias triode 709 negatively, thus causing an increase in the plate-cathode voltage drop, this triode reducing the high voltage supply to the photomultiplier and therefore reducing the gain of the photomultiplier tube. If the gain of this loop is very high, the reference signal will remain practically constant and it then follows, from the previously discussed considerations, that the overall gain of the system will also remain constant for the wire signal. The gain of the photomultiplier 706 is very markedly affected by its dynode voltages so that the tube and the entire system possess a high degree of sensitivity to error signals appearing on the grid of the triode 709. The functioning of the dynode voltage regulator circuit including diode 743 and triode 709 may be compared with the functioning of the triodes 234 and 236 in Fig. 2 which constitute the voltage regulator circuit in the previous system. However, since the photomultiplier is more sensitive to the dynode voltage changes than the oscillator and the filament 241 of the lamp source 10, the self-compensating system disclosed in Fig. 7, in this respect, is superior to the one disclosed in Fig. 2. It should also be noted in this connection that the system disclosed in Fig. 7 will respond to fast changes much more readily than the system disclosed in Fig. 2 or 4 since it does not include, as one of its elements, filament 241 of the source 10 which may possess, relatively speaking, large calorific inertia.

The excitation of the light source 10 in Fig. 7 is furnished by the oscillator including triodes 746 and 748 whose circuit is identical to that of the oscillator 258—260 disclosed in Fig. 2 except that the screen grids are now connected to the positive source of potential of a rheostat 750 so that the output of this oscillator is no longer controlled by any error signal. However, its amplitude can be adjusted, if so desired, by adjusting the rheostat 750. The frequency of this oscillator may be sufficiently high to avoid light modulation in filament 270.

Summarizing the action of the circuit disclosed in Fig. 7, the reference and wire signals are amplified in alternate succession by the photomultiplier 706 whereupon they are impressed on the grids of the triodes 720 and 721. The output of the triode 721 which consists of the wire and reference signals is impressed on the grids of the electronic switch 730, 731, which is co-phased with the operation of the scanner. The comparison of the results of this integration of signals appears as a reading of meter 44 which directly indicates the diameter of the wire. The system is rendered self-compensating by deriving an error signal by means of triode 720, diode 743, and triode 709, this error signal being controlled solely by the reference signal. The error signal in turn controls the amplification effected by the photomultiplier.

It is to be noted that Fig. 7 will function as it does only when there is some significant difference between the amplitudes of the reference and wire signal. A system which operates with the wire and reference signals having equal amplitudes is disclosed in Fig. 10 and will be described in connection with the description of that figure.

Figure 8:
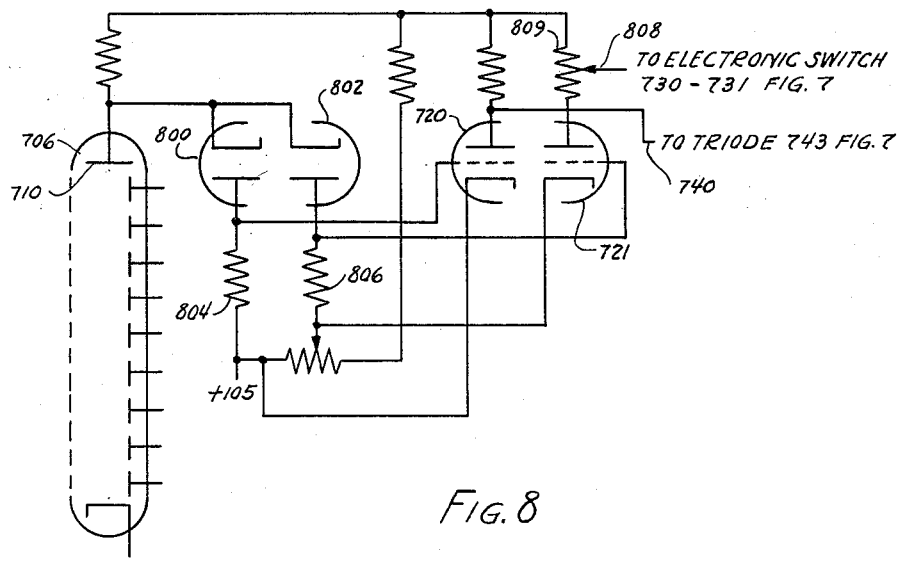
Figs. 8 through 10 are schematic diagrams illustrating modifications of Fig. 7.

The system disclosed in Fig. 8 is identical in all respects to that disclosed in Fig. 7 except that two diodes 800 and 802, connected in parallel, have been introduced between the photomultipler 706 and the triodes 720 and 721. Accordingly, all the remaining components of the circuits which are necessary for completing the system illustrated in Fig. 8 are found in Fig. 7 and therefore, for the sake of simplicity, the remaining elements are not illustrated in Fig. 8. In describing the functioning of the triodes 720 and 721 of Fig. 7, it has been stated that these triodes act as a two-step or a two-gate or a variable mu amplifier which has a very low degree of amplification for the low amplitude signals, and a much higher degree of amplification for the peak portions of the signals. While this function is performed reasonably well by this amplifier, it can nevertheless be further enhanced by interposing the diodes 800 and 802 between the photomultiplier and the triodes 720 and 721 and by adjusting the cathode-anode potential of these diodes so that they will become conductive only at the peaks of the signals appearing in the output of the photomultiplier. Thus, in Fig. 8, it is these two diodes that eliminate the amplification of the low amplitude portions of the signals appearing in the output of the photomultipler. No current can flow through diode resistors 804 and 806 as long as the plate potentials of these diodes are negative with respect to their cathodes. Accordingly, when the plate 710 potential of the photomultiplier is greater than the plate potential of the diodes, no current will flow through the resistors 804 and 806. However, when the potential of plate 710 drops below this value, a current will flow through the resistors 804 and 806 and triodes 720 and 721 will amplify the signals appearing in these resistances in a normal manner. Therefore, triodes 720 and 721 will have a signal output only when the voltage appearing in the plate circuit of the photomultiplier is sufficiently low to overcome the bias of the diodes 800 and 802. Thus, these diodes perform the same function as the peak amplifier 41 in Fig. 2. The biasing of the two diodes may be adjusted so that while diode 802 will respond to the reference as well as the wire signal, diode 800 will respond only to the reference signal. Therefore, the output of triode 721 will correspond to the output of the similarly numbered triode in Fig. 7, i. e., it will have the reference as well as the wire signal. Accordingly, the potentiometer arm 808 which is connected to the plate resistor 809 should be connected to the control grids of the triodes 730 and 731 in Fig. 7 which, as will be remembered, represent the electronic switch of the system. The plate output of the triode 729, however, should be connected over conductor 740 to the triode 743 which detects the reference signal and eventually controls the dynode voltages.

Figure 9:
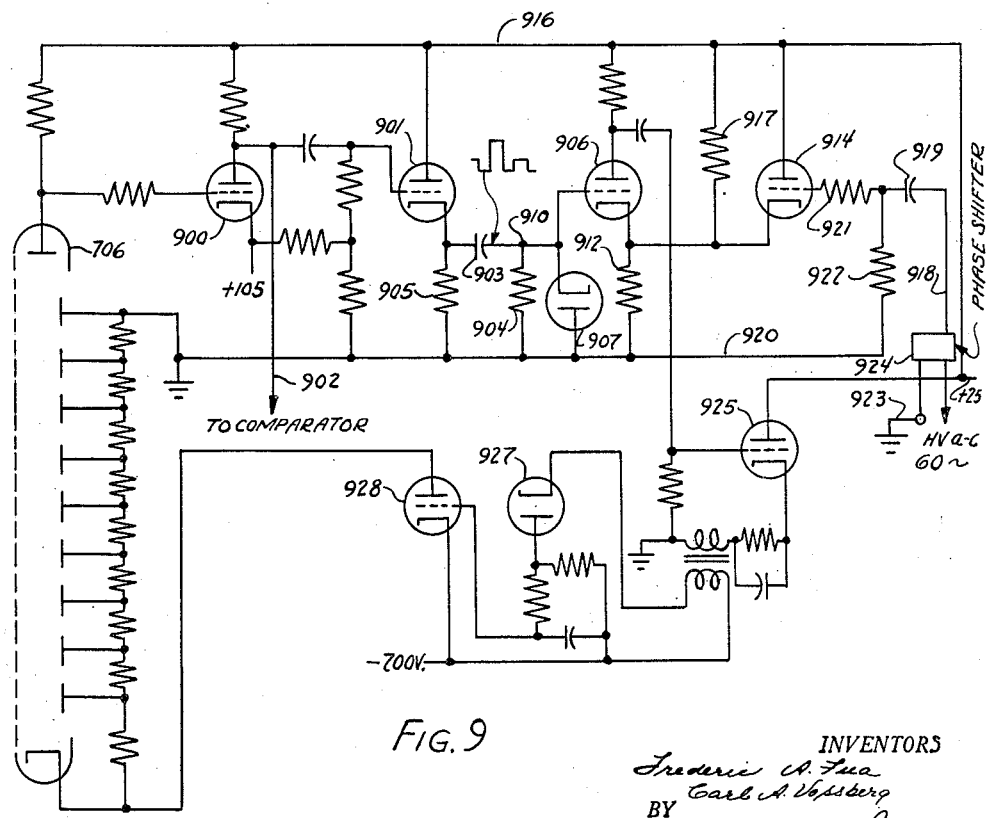

Fig. 9 discloses an additional modification of the system disclosed in Figs. 7 and 8, the modification being directed primarily to making the reference system completely independent of the wire signal in the circuit used for controlling the dynode voltages. The system disclosed in Fig. 9 is adapted to function especially when there is no regard to the relative amplitudes of the reference and the wire signals.

The output of the photomultiplier 706 is impressed on a triode 900 which is so biased as to impress both wire and reference signals on the control grid of a triode 901 which represents the first stage of the dynode voltage control circuit. The output of triode 900 is also impressed over a conductor 902 on the comparator circuit such as triodes 730, 731, 738 and 739 in Fig. 7. Triode 901 is a cathode follower with a condenser 903 and a resistance 904 shunting its cathode resistor 905. Resistor 904 is a grid resistor for a triode 906 which acts as an electronic switch separating the reference signals from the wire signals. Its grid is shunted to ground through a diode 907 which acts as a direct current restorer or a clamper device, clamping the potential appearing on the grid of triode 906 and permitting maintenance of complete independence of the reference signal from the wire signal. In order to maintain this independence of the signals from each other, the magnitude of the signal must be derived from a fixed reference voltage or a base line and not from the means of the combined wire and reference signals. This base line is taken from the saturation point of amplifier 900. It is shown in Fig. 3—B as the new signal zero except that it has opposite polarity. Condenser 903 is changed on a negative peak corresponding to the base line and a signal is developed across resistor 904 in the positive direction only with the base line on zero volts.

This is made possible because of the use of the diode 907 which always restores the potential at point 910, which is the potential of the grid of triode 906, to the very same new signal zero potential illustrated in Fig. 3—B irrespective of the amplitudes of the wire and reference signals. Therefore, the amplitude of either signal will be independent of the magnitude of the other. For example, if the peak amplitude of the reference signal is some given value and a thick wire is inserted before the wire aperture 27, there will be a sudden drop in the amplitude of the wire signal, yet the amplitude of the reference signal will remain the same and will not be affected by such fluctuations in the wire signal. The triode 906, diode 907 circuit, therefore, functions identically, in this respect, as do diodes 224 and 226 and triode 234 in Fig. 2. In order to select only the reference signal at the triode 906, its cathode resistor 912 is connected to a control tube 914 the cathode of which is connected to the cathode of triode 906 and the two are then connected to the positive bus 916 over a resistance 917. The grid of triode 914 is connected to a source of alternating current potential over a conductor 918 and the isolating condenser 919 and to a grounded bus 920 over resistors 921 and 922. It is to be understood that one side of the alternating current source is grounded, as illustrated at 923. When the alternating current voltage impressed on the grid of triode 940 is positive a high positive voltage is generated across the cathode resistor 912 which completely disables triode 906. The phasing of this circuit is identical to the phasing of the previously described circuit, namely, this disabling voltage occurs only during the appearance of the wire signal. To accomplish this result, a phase shifter 924 may be inserted between the grid and the source of alternating current potential. On the negative half cycle, triode 914 is at cut-off and the normal bias derived by the resistances 912 and 917 now controls triode 906. The latter is so adjusted that triode 906 is rendered conductive by the reference signal with the result that the latter is impressed on the grid of a triode 925 which is a cathode follower and acts as an impedance matching tube for a rectifier 927. Rectifier 927 detects the reference signal and controls the conductivity of a triode 928. The cathode-anode circuit of triode 928 is connected in series with the source of dynode voltage with the result that the state of its conductivity adjusts the photo-multiplier dynodes' voltage supply to correct for variations in the system. In this manner, the two signals—wire and reference—may have any relative value and the error voltage is solely a function of the amplitude of the reference signal. Thus the stability of the entire system and its self-compensating characteristics are further improved by operating the voltage regulating circuit near balance stability.

Figure 10:
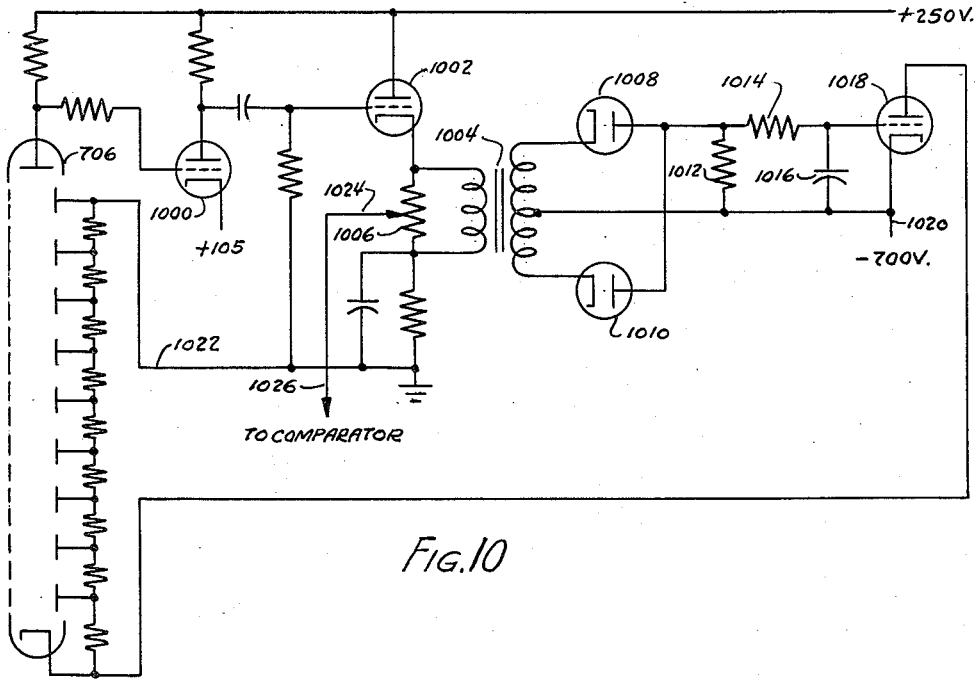

Fig. 10 discloses a system which is especially suitable for operating on wire and reference signals which have very nearly equal amplitudes. In this case, the output of the photomultiplier 706 is impressed on a biased triode 1000 which responds to both wire and reference signals. These are impressed on a cathode follower 1002 the cathode circuit of which includes a transformer 1004 and a potentiometer 1006. The secondary of transformer 1004 is connected to the full wave detector including diodes 1008 and 1010. The output of the detector is impressed on a filter including resistors 1012, 1014, and condenser 1016 and the output of the filter is impressed on the grid of a voltage regulator tube 1018 which is connected in series with the high voltage source of potential so that the degree of its conductivity controls the voltage impressed on the dynodes of multiplier 706. The circuit is completed over conductor 1020 which is connected to the negative source of potential and bus 1022 which is connected to the positive terminal of the same source. The potentiometer arm 1024 is connected over a conductor 1026 to the comparator circuit which was discussed fully in connection with the previous figures. Thus, in Fig. 10 the dynodes' voltage is controlled by the wire as well as by the reference signal, while the operation of the comparator circuit is identical to that in the previous figures. As mentioned previously, this system is applicable only when the amplitude of wire signal is almost equal to the amplitude of the reference signal. When the amplitudes of the two signals are very well balanced, the error signal is substantially equal to that obtained in the systems which use only the reference signal for obtaining control of the photomultiplier. At points off balance, the effect is merely to slightly increase the apparent discrimination. As was already mentioned, the comparator operates on the relative magnitude of the two signals and is practically unaffected by the absolute values of the reference and wire signals over a very great range. A full wave detector is used in this figure since this provides more effective control, faster operation, greater ease in filtering, and less tendency towards instability.

Figure 11:
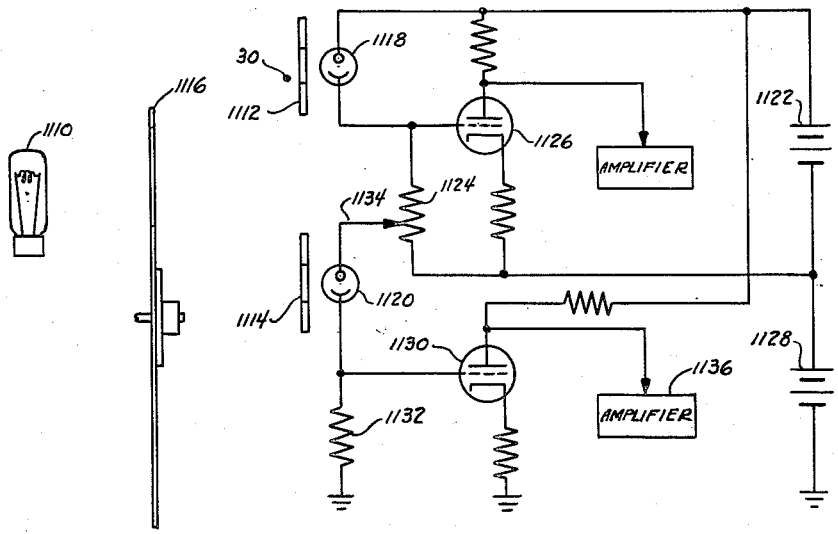
Fig. 11 is a schematic diagram of a system using two photoelectric cells for obtaining the reference and the intelligence signals.

Fig. 11 discloses a light modulation system which differs from the foregoing systems in that two photoelectric cells are employed. In this figure, a light source 1110 is directed toward two apertures 1112 and 1114, the first one being the wire aperture and the second the reference aperture, with wire 30 or any other object being in the field of the wire aperture. A light chopper 1116 is interposed between the apertures and two photoelectric cells 1118 and 1120 so that the photoelectric cell 1118 is responsive to the wire signal while the photoelectric cell 1120 is responsive to the reference signal. Alternatively, the light source itself can be modulated. A source of potential 1122 is connected between the cathode and the anode of the photoelectric cell 1118 with the potentiometer 1124 being included in this series circuit. This potentiometer represents a grid resistor of a triode 1126 which operates as a direct current amplifier of the signals produced in the photoelectric cells 1118 and 1120. An identical circuit exists for the photoelectric cell 1120 with a source of potential 1128 and a triode 1130 connected by its grid to a resistor 1132. Therefore, triode 1130 will amplify only the reference signal. A potentiometer arm 1134 is connected to the potentiometer resistance 1124 so that the combined signals of the two photoelectric cells are in opposition and, if applied simultaneously, would cancel each other if their amplitudes are equal. Only the net signal is amplified by triode 1126 when the amplitude of the reference signal differs from the amplitude of the wire signal. The degree of balance is adjusted by adjusting the position of the potentiometer arm 1134 on the resistance 1124 which allows more or less signal from the photoelectric cell 1120 to be developed in opposition to the signal from photoelectric tube 1118. If the signal from the photoelectric cell 1118 varies from that of the photoelectric cell 1120, a varying output signal is amplified by triode 1126 and this corresponds to the changes in the dimensions of the wire. The output from triode 1130 contains only the reference signal and as such can be amplified in an amplifier 1136 in a normal fashion and then impressed on the lamp voltage regulator such as tubes 258 and 260 illustrated in Fig. 2 through a voltage regulator circuit such as diode 226 and triodes 234 and 236 illustrated in Fig. 2. If the output of triode 1126 represents the net signal only, or the signal expressing the changes in the diameter of the wire, it can be additionally amplified and used in a meter circuit such as the one disclosed in Fig. 2 including triodes 212 and 213. When such circuit is used, then the reference signal is also impressed on the comparator circuit and acts as a standard for comparing the amplitude of the net signal with respect to the standard signal.

Figure 12:
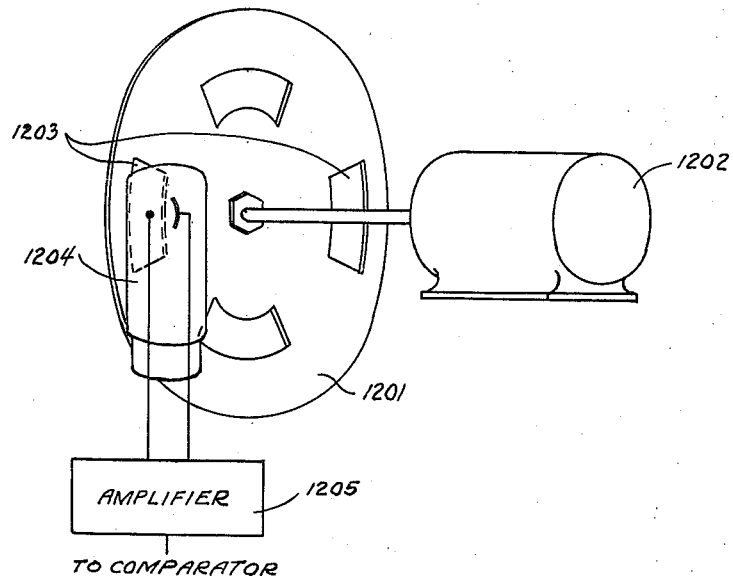
Figs. 12 and 13 illustrate modified embodiments of the phasing means.

The systems previously described employ a synchronous type of scanner. This can take on a different form where the electrical system is synchronized with that of the scanner. For example, scanner 1201 in Fig. 12 can be similar to scanner 14 of Fig. 1 but driven by a motor 1202 which need not be synchronous and can have any reasonable speed. As the aperture 1203 passes before auxiliary photocell 1204, light falls on the cathode of photocell 1204 and the resultant signal is amplified by amplifier 1205. This signal is now automatically in synchronism with the scanner. Accordingly, the output can be directly applied to the plates of comparator tubes 212 and 213 of Fig. 2, instead of requiring the transformer power supply. If the scanner 1201 is also used for its original function, i. e. originating the wire and reference signals, the signal photocell may be radially or angularly spaced from photocell 1204 so that they operate from different apertures and there is no mutual interference.

Figure 13:
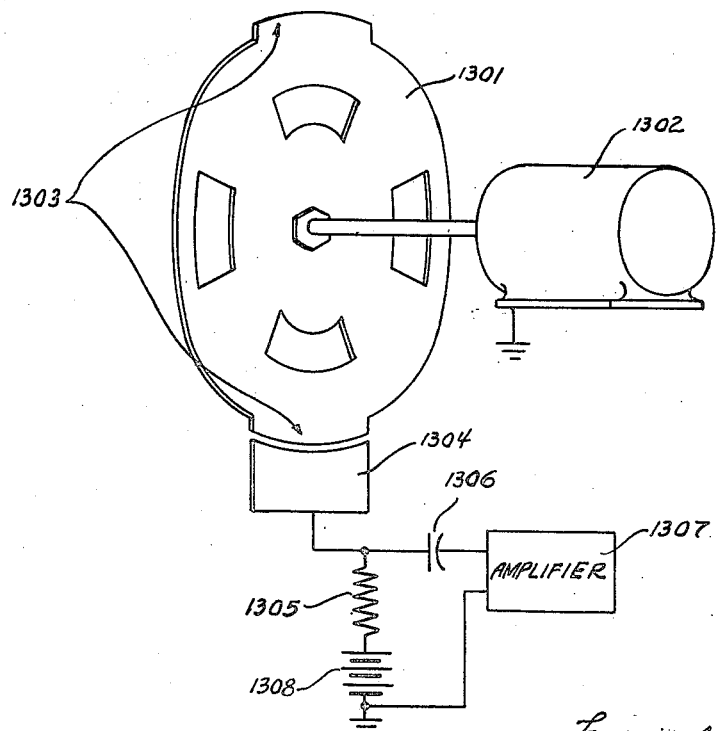

A slightly different manner for generating the synchronizing signals is given in Fig. 13. As before, the scanner 1301 is driven by motor 1302. Projection 1303 on the scanner induces a signal into amplifier 1307 by electromagnetic or electrostatic means. The latter means is indicated in Fig. 13. As the projection 1303 approaches member 1304, the capacity increases between 1303 and 1304 so that a charging current results from high-voltage source 1308 through resistor 1305. This produces a voltage across resistor 1305 which is passed on as a pulse to the amplifier through capacitor 1306. A pulse of opposite polarity is similarly developed as projection 1303 leaves vicinity of member 1304. The output of amplifier 1307 can be essentially a square wave voltage, automatically synchronized to the motor, it being obvious how such a square wave can be formed from the pulsed wave which is fed to the amplifier 1307.

Summarizing the systems disclosed in this application, an object the dimension of which is to be measured, produces light modulation by intercepting a portion of the light passing through a light aperture positioned in the vicinity of this object although it may be anywhere along the optical path, as will be evident. This light intelligence signal is transformed into an electrical intelligence signal and the latter is compared with a controlled reference electrical signal which is obtained by conversion of the light passing through the second or reference aperture, from the same source. Systems are disclosed in which either both the intelligence and the reference signals, or a reference signal only, can be used for rendering the entire system self-compensating. In several systems the compensation controlling signal, or the error signal, controls the intensity of light, while in other systems the error signal is used for controlling the dynodes' voltage in a photomultiplier with the light source in this case being connected to an independent source of potential which is not provided with any control connections. In the systems where the desired stabilities are accomplished by controlling the dynodes' voltage, the intelligence signal and the reference signal, can be combined and the resultant average signal used for obtaining this control. Such action is especially suitable for the systems where the amplitude difference between the intelligence and the reference signals is very small. Circuits are also disclosed which make all systems inherently independent of the absolute amplitude values of the reference and intelligence signals, the latter feature being accomplished by using direct current restorer circuits or clamper circuits and biased amplifiers which amplify primarily the upper portions of the amplitudes of the two signals with the result that the accuracy and the precision of the final measurements depend solely on the difference in the amplitudes of the two signals rather than on their absolute amplitudes. Various comparator circuits are also disclosed for measuring the above mentioned difference in the amplitudes of the two signals, the comparator circuits always being synchronized with the operation of scanners comprising a part of the optical system in the disclosed combination. The contemplated systems also disclose various means of scanning, some mechanical, such as those in Figs. 1 and 2, and some electronic, such as those in Fig. 6. In either case, as mentioned before, the operation of the scanning system is always synchronized and co-phased with the operation of the comparator circuits. The latter is accomplished either mechanically, by physically adjusting the position of the scanner, or electronically, by using a phase shifter. Various mechanical means are also disclosed for making the system a standard in itself by calibrating the intelligence aperture (Fig. 5) and for adjusting the amplitude of the reference signal by varying the opening of the reference aperture.

It should also be noted that whereas the light sources described emit visible light, sources of infra-red, ultra violet or other such radiation may be employed and suitable radiation-responsive photocells or the like will be employed in view of the particular type of radiation involved. This is of importance where the object to be measured is more or less transparent to visible light as where it is of glass or transparent plastic. The systems as shown can operate under such circumstances by merely considering the lamps as generators of the desired radiation and the photocells as responsive thereto.

What we claim is:

1. In a measuring system, a plate having a pair of apertures formed therein for receiving light beams therethrough to be measured, a shutter on one of said apertures for adjusting the effective size thereof, micrometer actuating means including a micrometer spindle connected to said shutter so as to move it across said one aperture according to the adjustment of said actuating means, said actuating means being calibrated whereby said effective size may be indicated, the other aperture being of triangular shape, a wire movable transversely of said triangular aperture, and micrometer means connected to said wire for moving it across said triangular aperture from the apex to the base thereof.

2. A device according to claim 1 and wherein said apertures are formed in substantially vertical alignment with each other, said micrometer means including a yoke ended spindle, said wire being connected across the legs of the yoke so as to be movable therewith, said spindle being threaded at its other end, a rotatable sleeve embracing said other end in threaded engagement, means for rotating said sleeve so as to advance or retract said spindle, a holder plate secured over said sleeve threaded end of the spindle, said holder plate being formed with a central, vertical, elongated slot and a coupling collar connected to said sleeve and extending through said holder plate slot.

CARL A. VOSSBERG.
FREDERIC A. FUA.

REFERENCES CITED

The following references are of record in the file of this patent:

UNITED STATES PATENTS

| Number | Name | Date |
|---|---|---|
| 1,617,241 | Fessenden | Feb. 8, 1927 |
| 1,881,336 | Voight | Oct. 4, 1932 |
| 2,290,606 | Burnett | July 21, 1942 |
| 2,408,023 | Kruper | Sept. 24, 1946 |
| 2,408,512 | Gradisar | Oct. 1, 1946 |
| 2,411,741 | Michaelson | Nov. 26, 1946 |
| 2,442,910 | Thomson | June 8, 1948 |